March 14, 1933.  H. J. HALSTED ET AL  1,900,989
COIN CONTROLLED DISPENSING APPARATUS
Filed July 24, 1930   5 Sheets-Sheet 1

Hobart J. Halsted
Norman R. Briggs
Inventors

By  Attorneys.

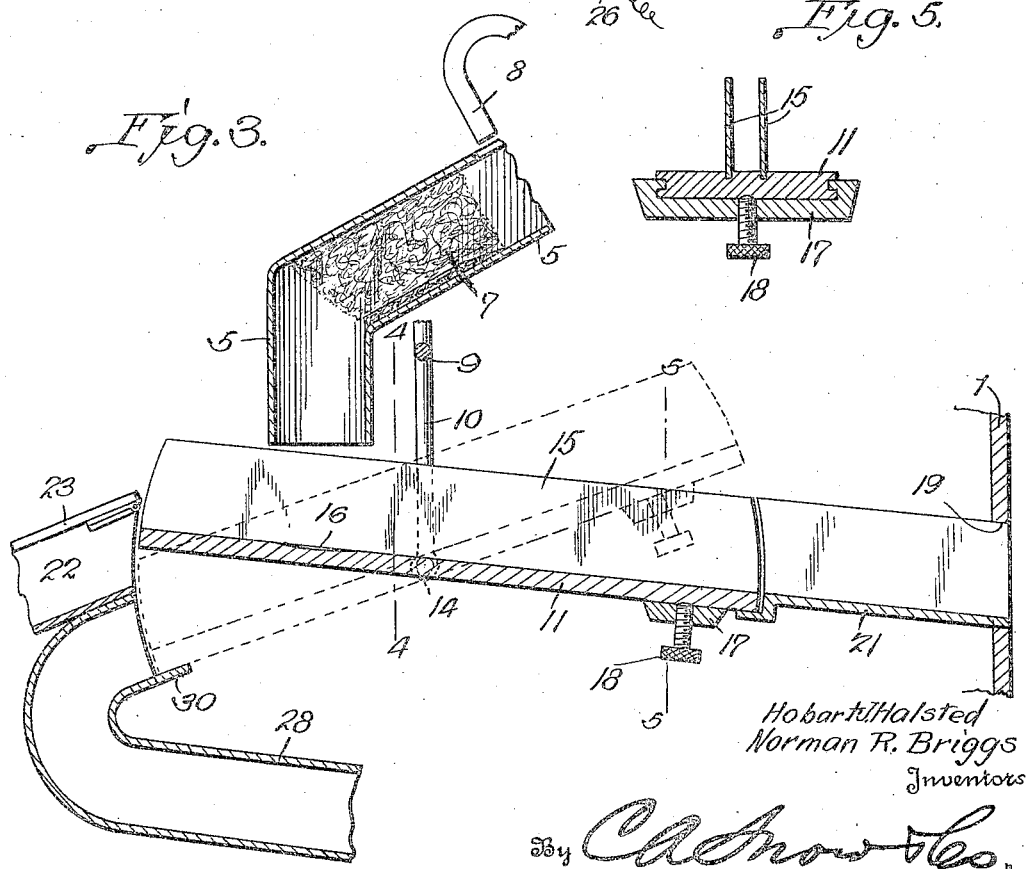

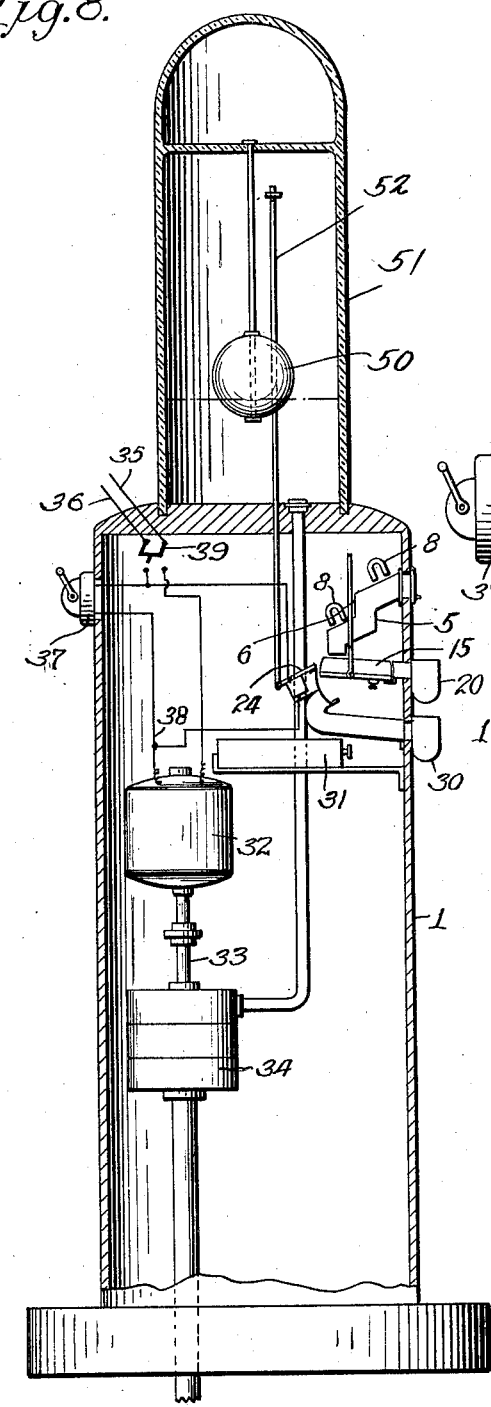
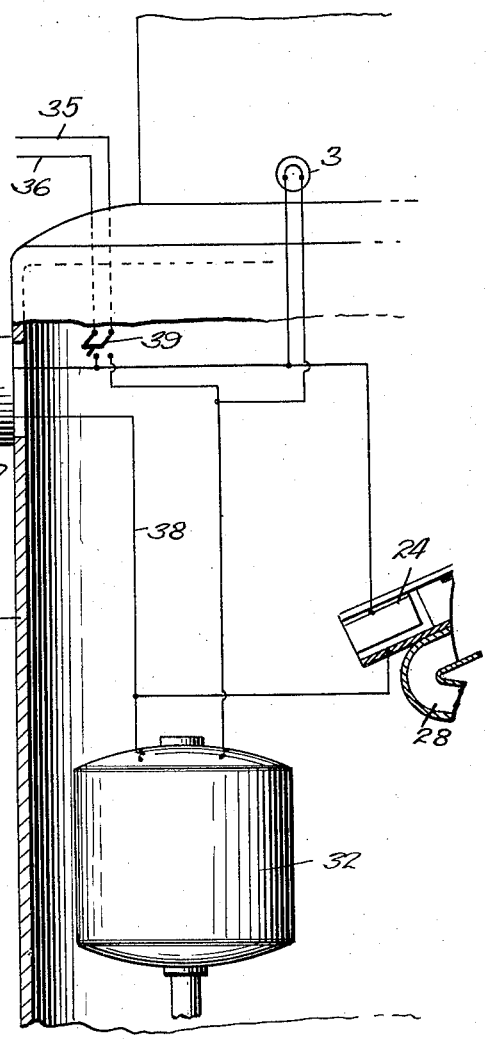

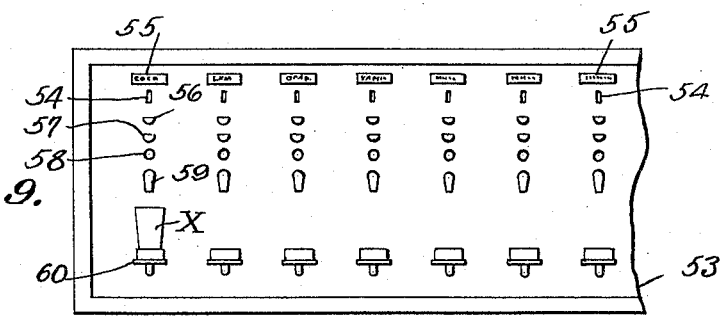
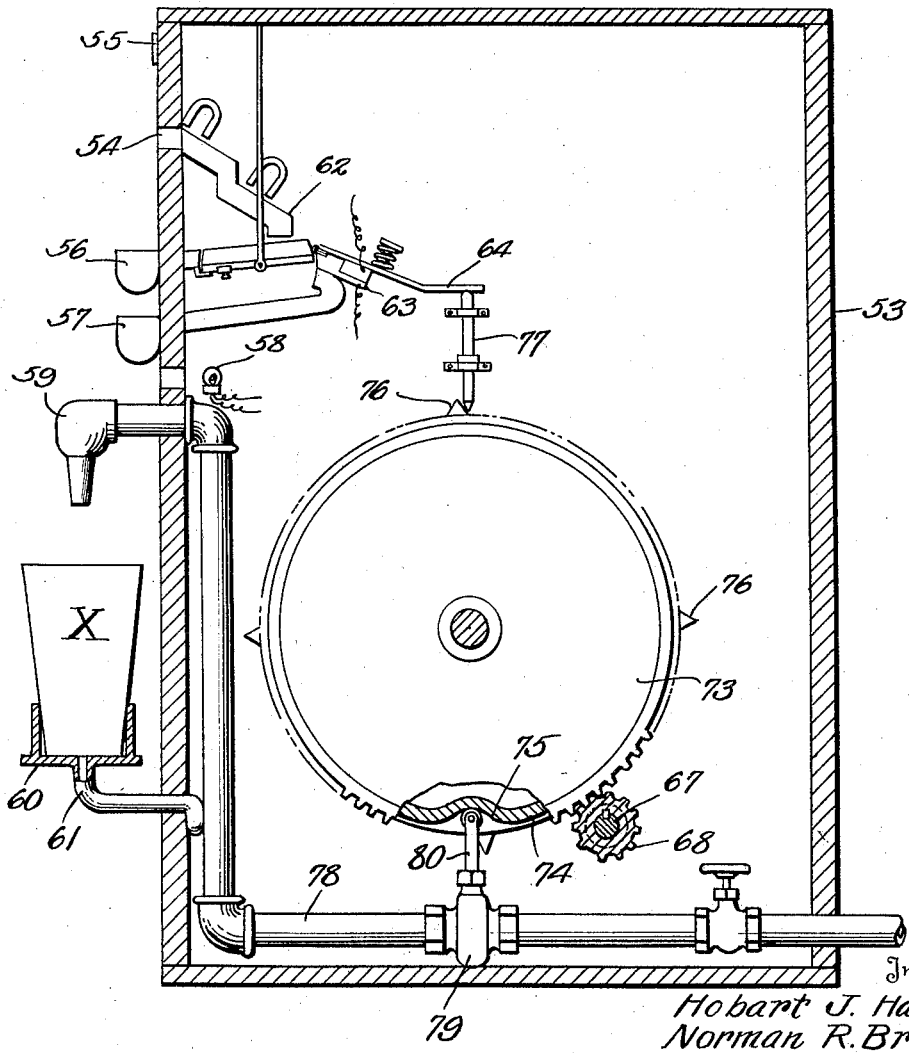

March 14, 1933.   H. J. HALSTED ET AL   1,900,989
COIN CONTROLLED DISPENSING APPARATUS
Filed July 24, 1930   5 Sheets-Sheet 5

Inventors
Hobart J. Halsted
Norman R. Briggs
By C. A. Snow & Co.
Attorneys.

Patented Mar. 14, 1933

1,900,989

UNITED STATES PATENT OFFICE

HOBART J. HALSTED AND NORMAN R. BRIGGS, OF BUFFALO, NEW YORK

COIN CONTROLLED DISPENSING APPARATUS

Application filed July 24, 1930. Serial No. 470,517.

This invention relates to vending machines designed primarily for use in dispensing liquids such as gasoline, oil, etc.

It is an object of the invention to provide a machine having coin-controlled mechanism adapted to be set in operation automatically when a coin of proper value is inserted in the machine, thereby to deliver to the customer the purchased amount of liquid.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 2 is an enlarged section through the coin-controlled switch and adjacent parts.

Figure 3 is a longitudinal section through co-operating coin guides.

Figure 4 is a section on line 4—4, Figure 3.

Figure 5 is a section on line 5—5, Figure 3.

Figure 6 is a section on line 6—6, Figure 2.

Figure 7 is an enlarged diagram showing the electric circuits of the apparatus.

Figure 8 is a section through a modified form of the structure.

Figure 9 is a front elevation of a portion of a modified structure utilizing the present invention as a means for dispensing any one of several different kinds of liquids.

Figure 10 is an enlarged section through the casing showing one of the liquid dispensing units.

Figure 1:
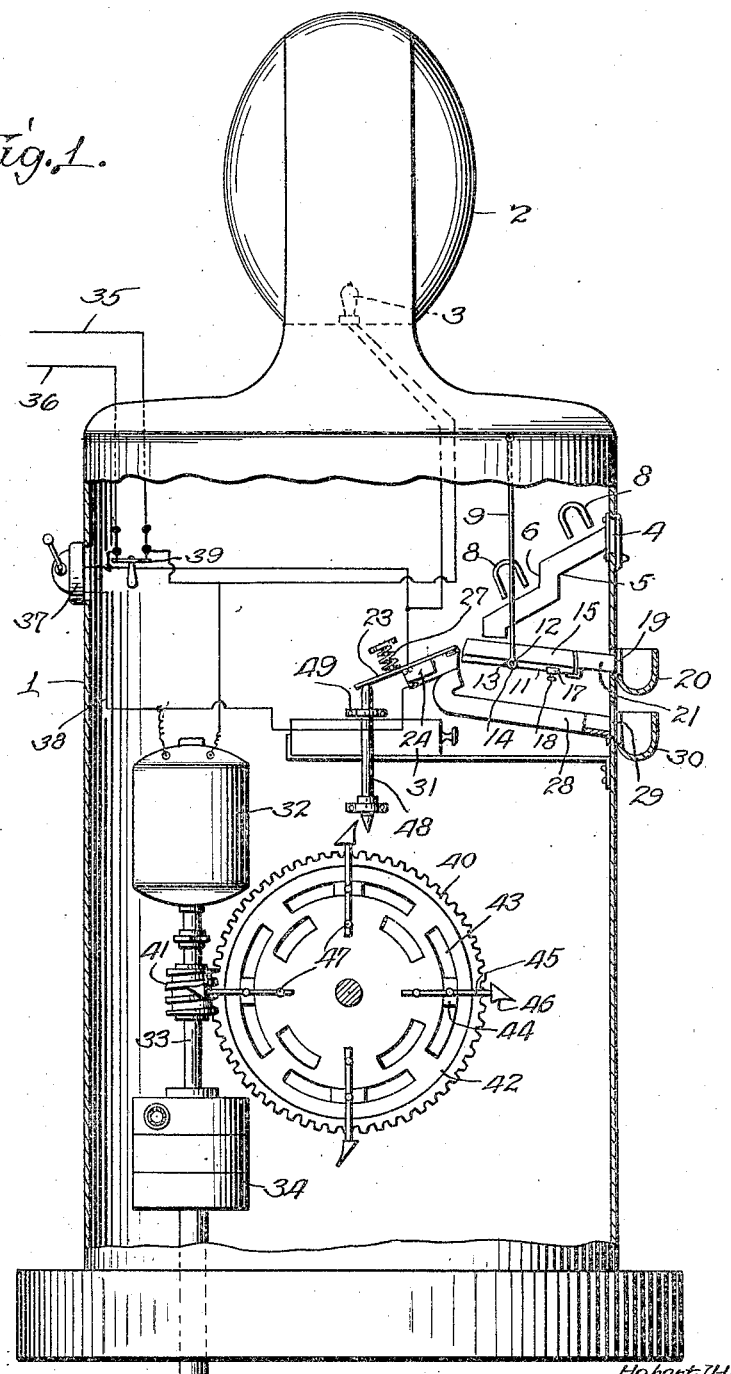
Figure 1 is a view partly in elevation and partly in section showing the complete apparatus, a portion of the apparatus being in diagram.
Figure 11:
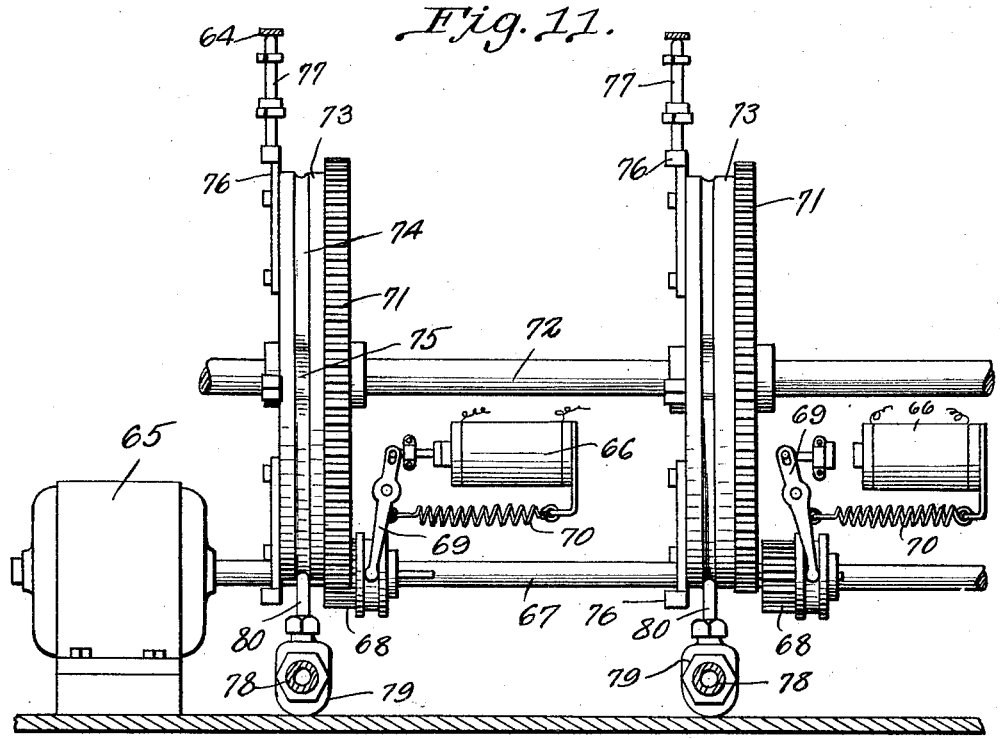
Figure 11 is a front elevation of a portion of the mechanism contained in the casing.
Figure 12:
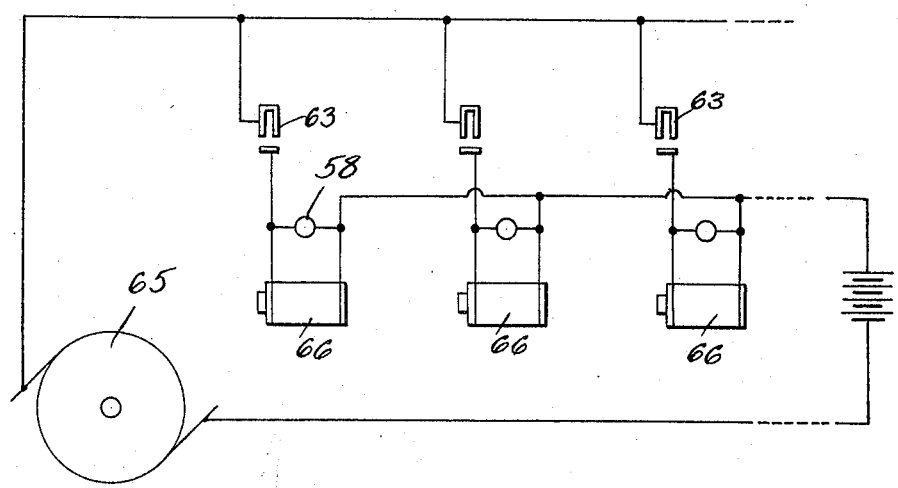
Figure 12 is a view showing in diagram the circuit for controlling the operation of the dispensing mechanisms.

Referring to the figures by characters of reference, 1 designates a casing which, if desired, can be provided with a globe 2 adapted to be illuminated by an electric lamp 3.

The casing is provided with a coin slot 4 opening into an inclined guide tube 5 which is offset downwardly at desired points, as indicated at 6, so as to retard the movement of an inserted coin or check. Adjacent to the outlet the tube is formed with a lining 7 of felt or other soft material which will tend to further retard the movement of the coin or check toward the point of delivery. One or more permanent magnets 8 can be located above openings in the top of the coin tube or guide for the purpose of stopping any checks or slugs made of iron or steel.

A hanger 9 is supported in the casing 1 and has a yoke 10 which straddles a coin weighing scales located where a coin delivered from the guide tube or channel will be deposited thereon. The scales consist of a base 11 having alining studs 12 which project into eyes 13 at the lower ends of the yoke 10. These studs are formed with knife edges indicated at 14 which bear downwardly on the eyes 13.

Parallel guide strips 15 are arranged upon the strips 11 and co-operate therewith to form a channel adapted to receive a coin delivered from the tube 5. The bottom of this channel is formed with a shallow recess 16 directly under the outlet of the tube 5 which will serve momentarily to retain a coin on the scales. A weight 17 is adjustable longitudinally of the strip 11 and is adapted to be held in place by means of a set screw 18.

It is intended to have the scales so proportioned that under normal conditions the weighted arm or end portion of the strip 11 will be one-half gram lighter than the weight of a coin intended to actuate the scales and allow the apparatus to operate. For example, if it is intended to use an American silver quarter in this apparatus, the weighted end portion of strip 11 will be overbalanced by the quarter even though it should be worn down until nearly one-half gram underweight. The weight 17 can be adjusted to adapt the apparatus to coins of other denominations.

When the scales are in normal position they are inclined downwardly from the outlet end of the tube 5 towards an outlet slot 19 which communicates with a trough or pocket 20 outside of the casing 1. Thus any coins underweight or any checks which are not of the proper weight will, when deposited in the channel formed between the strips 15, roll downwardly to and through slot 19 into the pocket 20 from which it can be removed by the customer.

As shown in the drawings a short stationary through 21 can be interposed between the scales and the slot for receiving a coin or check from the scales and delivering it through the slot to the pocket.

When a coin of proper value is deposited on the scales from the tube 5, the scales will be tilted to elevate the weighted end. This tilting action will be just sufficient to allow the deposited coin to roll from the scales into a channel 22. This channel can be formed with a hinged top strip 23 which carries an inverted guide channel 24 of conducting material. Projecting downwardly within this inverted guide channel is a stop ear 25. The bottom of the channel 22 is formed of conductive material as has been indicated at 26. Guide channel 24 is insulated from the bottom 26 of channel 22.

A spring 27 serves to hold the strip 23 normally pressed downwardly so that the inverted guide channel 23 is held normally in its lowermost position as shown in Figure 2.

A return channel 28 has its inlet located directly below the inlet end of the channel 22 and from this inlet it is extended back to an outlet slot 29 opening into a cup 30 outside of the casing 1. The inlets of the two channels 22 and 28 are supported close to the adjacent end of the scales. Consequently should a coin or check of more than the required weight be deposited on the scales, the scales would be tilted abruptly and arrive against a stop 30 before the coin or check would have a chance to enter channel 22. Instead, said coin or check would roll into the channel 28 and be delivered back to the customer.

A coin box 31 is located under the outlet end of channel 22 so as to receive coins delivered from said channel.

An electric motor is arranged within the casing 1 and is connected by a shaft to a suitable pump. The motor has been indicated at 32, the connecting shaft at 33, and the pump at 34.

Lead wires for conducting electric currents to the motor extend into the casing as indicated at 35 and 36. The wire 35 is extended directly to the motor and to one terminal of the lamp 3. Wire 36 is electrically connected to the other channel 24 which, as before stated, is formed of conductive material. Wire 36 is also connected to a lock-controlled switch 37 located outside of the casing and which is adapted to be actuated solely by the person or persons holding the proper key. From this switch an electrical connection 38 extends to the motor 32 and to the bottom 26 of channel 22, this bottom as before explained, being formed of conductive material. A controlling switch 39 can be provided in the leads 36 and 35. By opening this switch, the operation of the apparatus will be stopped completely. Under normal conditions, however, the switch is closed.

A gear 40 is mounted for rotation in the casing 1 and is actuated by a worm 41 secured on shaft 33. A disk 42 rotates with the gear and has a series of arcuate slots 43. A block 44 is adjustable longitudinally within each slot. Each of these slots bears a radial arm connected thereto as shown at 45, the outer end of the arm being provided with a head 46 constituting a lifting cam. These arms and their lifting cams can be held against relative movement by means of set screws 47.

These set screws when forced against the side of the disk 42, will hold the parts securely against movement in any direction relative to the disk.

A push rod 48 is slidably mounted in guide 49. The lower end of this push rod is supported in the path of the lifting cam or head 46 while the upper end bears against the strip 23.

Under normal conditions the switch 39 is closed and the lamp 3 is lighted. This will indicate to a prospective customer that the apparatus is ready for use.

Scales are normally inclined downwardly toward the channel 21 and slot 19. When a coin of proper value is inserted into the slot 4, it will gravitate within the tube or channel 5, being retarded in its movement by the offset portion 6 and by the soft lining 7. Ultimately the coin will be deposited gently on the recessed portion 16 of the scales and, as it is of proper weight, the scales will be tilted and allow the coin to roll into the channel 22. As the coin comes against the stop ear 25 it will complete a connection between the terminals formed by the bottom 26 and the inverted channel 24 so that a circuit will thus be established from the lead 36 through these terminals and the coin to the motor and then to the lead 35. Consequently the motor will start to operate and will not only actuate the worm 41, but also drive the pump.

The worm 41 will slowly rotate gear 40 and disk 42, and at the same time the pump will operate to lift liquid and supply it to the customer. The operation described will continue until one of the lifting heads of cam 46 comes against the lower end of the rod 48, at which time said rod will be pushed upwardly and the strip 23 elevated against the action of spring 27. This will remove the stop gear 25 from the path of the coin indicated at C and said coin will be free to roll out of the channel 22 and drop into the box. It will continue to maintain a circuit through the terminals 26 and 24, however, until after it leaves the channel 22, and this will give sufficient time for the motor to carry the lifting head or cam 46 slightly past and out of contact with plunger 48. Said plunger will therefore promptly return to its initial position and as the circuit to the motor will be broken when the coin drops into the box 31, the apparatus will stop and be automatically reset.

Should a slug formed of iron or steel be directed into the tube 5, it would be stopped by one of the magnets 8. If a slug should get past these magnets and be under-weight, it would be delivered back through the slot 19.

Should the coin or check be overweight, the weight thereof will cause the scales to tilt downwardly so as to allow the check to roll into the return channel 28 whereby it will be delivered back to the customer by way of slot 29.

It is to be understood that the number of lifting cams or heads 46 can be varied, depending upon the amount of fluid to be delivered when a coin of proper value is deposited.

While lifting mechanism such as shown in Figure 1 can be used for breaking the circuit when a desired amount of liquid has been dispensed, other means can be used for this purpose. For example, and as shown in Figure 8, a float 50 can be supported in a measuring container 51 so as to rise and fall with the liquid supplied thereto from pump 34. This float can be used to actuate a rod 52 connected to member 24 so that when a desired level of liquid is reached said member will be actuated to release the coin which closes the circuit to the motor.

While this apparatus is particularly useful in dispensing gasoline, or oil and the like, it can also be used for dispensing other liquids as a part of store service.

Various modifications of the structure can be made within the scope of the invention.

In Figures 9, 10, 11 and 12, for example, there has been shown an apparatus whereby beverages of different kinds can be dispensed in predetermined amounts. In this modified structure the casing 53 can be provided with a series of coin slots 54 and above each of these slots can be arranged a card 55 or the like indicating the kind of beverage which will be dispensed when a coin is placed in the adjacent slot. Below each slot can be arranged pockets or cups 56 and 57 similar to those shown at 20 and 30 for receiving discarded coins. A pilot light 58 can also be arranged beneath each coin slot 54 and adjacent thereto is an outlet nozzle 59 located above the cup holder 60. This cup holder has a drain 61 extending from the bottom thereof back into the casing 53.

Coin discarding mechanism such as heretofore described and which is indicated generally at 62 is provided adjacent to each of the slots 54 and cooperating with each of these mechanisms is a coin controlled switch 63 such as heretofore described and as illustrated in detail in Figures 2, 4 and 6. This mechanism includes a hinged top strip 64 which, when lifted, will release a coin and break an electric circuit which includes an electric motor 65 and a solenoid 66. One motor only is used, this being adapted to drive shaft 67. Feathered on the shaft are small gears 68, one gear being provided for each dispensing unit.

Each gear 68 is adapted to be shifted by a lever 69 connected to and operated by one the solenoids 66. Springs 70 act to hold the several gears 68 normally out of mesh with large gears 71 which are mounted for independent rotation on a shaft 72.

Each of the gears 71 has a disc 73 rotatable therewith and each disc has a circumferential groove 74 in which cam depressions 75 are located at regularly spaced intervals. Disc 73 corresponds with the disc 42 heretofore described and has lifting cams 76 projecting beyond its periphery at regular intervals, these cams corresponding with the cams 46. The cams 76 equal in number the cam depressions 75 and each of them is adapted to come against and elevate a push rod 77 which, like rod 48, is adapted to lift the strip 64 and release a deposited coin so as to break the electric circuit established by the coin.

A pipe 78 leads to the nozzle 59 from a suitable container, not shown, in which is held a supply of the beverage to be dispensed. This pipe has a valve 79 the stem 80 of which normally projects into groove 74.

Under normal conditions the stem 80 is seated in one of the cam depressions 75. At that time valve 80 is closed and rod 77 is located directly back of one of the cams 76 as shown in Figure 10.

When a coin of the proper denomination is placed in the coin slot indicated by the name of the beverage desired, it will travel, as heretofore explained, to the switch 63 where it will be held and establish a circuit to the motor 65 and to the solenoid 66 associated with said switch. The pilot light 58 will also be placed in circuit and will indicate the nozzle 59 under which a cup X or other container is to be placed. As soon as the circuit is closed the energized motor will drive shaft 67 and all of the gears 68 but as only solenoid was energized, only the gear 68 controlled by said solenoid will be shifted into mesh with its gear 71. Consequently only one gear 71 and one disc 73 will be rotated, these being the ones associated with the valve controlling the flow of liquid to the selected nozzle 59. As soon as this disc 73 begins to rotate, the stem 80 will be pushed out of the cam depression 75 and will be guided in groove 74 until the next cam depression 75 is reached.

While the valve stem is in the groove fluid can flow freely to the nozzle and this flow will continue until the valve stem enters another depression 75. Immediately prior to the movement of the stem into the cam depression, one of the cams 76 will push rod 77 and lift strip 64. This will release the coin and break the circuit as has heretofore been explained so that the apparatus will stop and will be reset to receive another coin.

The mechanism is so timed that the portion delivered from the nozzle can all be contained in the receptacle X.

Obviously the apparatus can be used for dispensing any number of beverages simply by increasing or reducing the number of depressing units.

Different fluids other than beverages can be dispensed by this modified form of apparatus.

What is claimed is:

1. In a vending machine an electric motor, a rotatable member driven thereby, a guide channel for receiving checks, and having a bottom of conductive material, a movable member constituting an extension of the top of the channel, an inverted channelled contact carried by said member and insulated from the bottom of the guide channel, means on the contact for stopping a check supplied thereto and maintaining an electrical connection between the contact and the bottom of the guide channel, a circuit including the motor and controlled by said check, and means actuated by the rotatable member for shifting the channelled contact to release the check and break the circuit to the motor, said means including a series of lifting cams carried by and adjustable relative to each other on the rotatable member, and a push member for transmitting thrust from each cam to the channelled contact.

2. In a vending machine an electric motor, a rotatable member driven thereby, a guide channel for receiving checks, and having a bottom of conductive material, a movable member constituting an extension of the top of the channel, an inverted channelled contact carried by said member and insulated from the bottom of the guide channel, means on the contact for stopping a check supplied thereto and maintaining an electrical connection between the contact and the bottom of the guide channel, a circuit including the motor and controlled by said check, and means actuated by the rotatable member for shifting the channelled contact to release the check and break the circuit to the motor, said means including radial arms on the rotatable member, means for adjusting the arms relative to each other, a cam on each arm, and a member for receiving thrust from any one of the cams to shift the channelled contact and release the circuit closing check.

3. In a vending machine an electric motor, a rotatable member driven thereby, a guide channel for receiving checks, and having a bottom of conductive material, a movable member constituting an extension of the top of the channel, an inverted channelled contact carried by said member and insulated from the bottom of the guide channel, means on the contact for stopping a check supplied thereto and maintaining an electrical connection between the contact and the bottom of the guide channel, a circuit including the motor and controlled by said check, and means actuated by the rotatable member for shifting the channelled contact to release the check and break the circuit to the motor, said means including lifting cams carried by and adjustable relative to the rotatable member, and a push member for transmitting thrust from the cam to the channelled contact, and resilient means engaging the movable extension member for holding the thrust receiving member normally in position for engagement by the cams and the channelled contact normally in check receiving and retaining position.

In testimony that we claim the foregoing as our own, we have hereto affixed our signatures.

HOBART J. HALSTED.
NORMAN R. BRIGGS.